United States Patent [19]
Yoo

[11] Patent Number: 5,954,614
[45] Date of Patent: Sep. 21, 1999

[54] APPARATUS FOR CHANGING POWER DIRECTION FOR BICYCLE

[75] Inventor: Moon-Soo Yoo, Chungcheoungbuk-do, Rep. of Korea

[73] Assignee: World Industry Co., Ltd., Chungcheongbuk-do, Rep. of Korea

[21] Appl. No.: 09/085,030

[22] Filed: May 28, 1998

[30] Foreign Application Priority Data

Jan. 20, 1998 [KR] Rep. of Korea .................. 98-1617

[51] Int. Cl.$^6$ .............................. F16H 3/44; B62M 11/14
[52] U.S. Cl. .................... 475/294; 475/297; 475/324; 475/12; 74/810.1; 280/236
[58] Field of Search ................... 475/12, 294, 296, 475/297, 323, 324, 326; 74/810.1; 280/236, 237, 238

[56] References Cited

U.S. PATENT DOCUMENTS

| | | | |
|---|---|---|---|
| 355,672 | 1/1887 | Wuterich | 475/12 X |
| 399,003 | 3/1889 | Bentley | 475/12 |
| 479,177 | 7/1892 | Vogel | 74/810.1 |
| 678,486 | 7/1901 | Head | 475/12 |
| 692,658 | 2/1902 | Head | 475/12 |
| 743,867 | 11/1903 | Head | 74/363 |
| 1,275,505 | 8/1918 | Veyret | 74/810.1 |
| 3,915,260 | 10/1975 | Kim | 74/810.1 X |
| 4,667,934 | 5/1987 | Ottemann | 475/12 X |
| 5,141,476 | 8/1992 | Chang | 475/297 |
| 5,368,279 | 11/1994 | Ottemann et al. | 74/810.1 X |
| 5,647,817 | 7/1997 | Chang | 475/294 |

FOREIGN PATENT DOCUMENTS

| | | |
|---|---|---|
| 94-13391 | 6/1994 | Rep. of Korea . |
| 97-42078 | 7/1997 | Rep. of Korea . |
| 207446 | 11/1923 | United Kingdom ..... 475/12 |
| 216106 | 10/1924 | United Kingdom ..... 475/12 |
| 97/21587 | 6/1997 | WIPO . |

OTHER PUBLICATIONS (1) English Language Abstract of Korean Publication No. 97-42078.

Primary Examiner—Charles A. Marmor
Assistant Examiner—Scott Lund
Attorney, Agent, or Firm—Lowe Hauptman Gopstein Gilman & Berner

[57] ABSTRACT

An apparatus for changing power direction for a bicycle is provided, which can travel the bicycle forward all the times, and simultaneously idle the bicycle, and transmit the driving force to a pedal shaft, thereby pulling back the bicycle without reverse-load. The power direction changing apparatus includes: a shaft housing having a first roll-pin holding portion in which a plurality of slots with a predetermined depth from the circumference are formed; a first changing ring having a first roll-pin race portion to which a plurality of roll-pins are attached to be exposed to the inner and outer directions, the first roll-pin race portion being connected to the first roll-pin holding portion of the shaft housing, capable of rolling against the first roll-pin holding portion, wherein the position of the first roll-pin race portion in the first roll-pin holding portion is changed by a changing lever controlled from the outside; a second changing ring having an inner circumference contacting the first roll-pin race portion of the first changing ring and an outer circumference along which a second roll-pin race portion to which a plurality of second roll-pins are exposed to the inner and outer directions is formed; a sun gear rotatably installed on the shaft housing, and integrally rotating together with the pedal shaft rotating by driving a pedal; a sprocket housing rotatably installed on the pedal shaft, having a ring gear and a race ring at its inner circumference, wherein the race ring contact the outer circumference of the second roll-pin race portion of the second changing ring; a carrier having one side along which a plurality of planetary gears to be engaged with the sun gear and the ring gear of the sprocket housing are formed and the other side along which a second roll-pin holding portion having a plurality of slots with a predetermined depth against the circumference is formed, wherein the carrier is rotatably installed to the inner circumference of the second roll-pin race portion of the second changing ring.

5 Claims, 8 Drawing Sheets

APPARATUS FOR CHANGING POWER DIRECTION FOR BICYCLE

TECHNICAL FIELD

The present invention relates to an apparatus for changing power direction for a bicycle, and more particularly, to an apparatus for changing power direction for a bicycle, which can travel the bicycle forward all the times by using a changing lever installed to a pedal shaft hub when pedaling forward or rearward, and idle the bicycle when pedaling rearward, as in a conventional bicycle, according to the intention of a rider, and simultaneously transmit the driving force of a sprocket to the pedal shaft through the engagement with gears, without a reverse-load when pulling back the bicycle.

BACKGROUND ART

The present invention is to improve a bi-directional pedaling apparatus disclosed in Korean Patent Application Nos. 94-13391 and 95-47910 by the present inventor.

According to the Korean Patent Application No. 94-13391, a closed space is formed between one end of a pedal shaft and a driving sprocket, and two one-directional ratchets are installed at the outer and inner portions of the closed space. Also, a ratchet wheel to which a plurality of planetary gears are rotatably fixed, and a changing lever capable of locking and releasing the outer one-directional ratchet are installed. The bi-directional traveling of the bicycle by the bi-directional pedaling apparatus of this invention will be described.

When one pedals forward, the pedal, the ratchet wheel and the driving sprocket integrally rotate by the outer one-directional ratchet, thereby traveling the bicycle forward. On the other hand, when one pedals rearward, the driving mechanism can be classified into two: one case of locking the upper ratchet by using the changing lever, and the other case of releasing the outer ratchet. First, when one pedals rearward while the outer ratchet is locked, the planetary gears rotates at their own position. As a result, the rotating direction of the pedal shaft is changed and the changed rotating direction is then transmitted to the driving sprocket, thereby traveling the bicycle forward. Also, when one pedals rearward while the outer ratchet is released, the planetary gears rotate and simultaneously revolve around the pedal shaft together with the ratchet wheel. As a result, the driving force of the pedal shaft cannot be transmitted to the driving sprocket, thereby idling the pedal.

According to the Korean Patent Application No. 95-47910, a shaft housing, a changing ring, a carrier, a sun gear and a sprocket housing are installed between a pedal shaft and a driving sprocket.

The shaft housing supports the rotating pedal shaft, and encloses the changing ring, the carrier and the sun gear. Also, a plurality of pawls are installed in the sprocket housing to control the carrier when one pedals rearward. The changing ring releases and inserts the pawls from and into the shaft housing when one pedals rearward, and the carrier has a ratchet at each one end of the inner and outer sides thereof, and a plurality of planetary gears which are rotatably attached at the other end such that the driving direction from the pedal shaft is maintained or changed to be transmitted to the sprocket. Also, the sun gear transmits the driving force of the pedal shaft to the carrier while being connected with the pedal shaft, and the sprocket housing has a gears therein, which always rotates the bicycle forward regardless of the forward and rearward pedaling directions by receiving the driving force from the carrier.

Thus, the bicycle can travel forward when one pedals forward, and can be idle when one pedals rearward, as in the conventional bicycle, according to the rider's intention.

According to the above-described bi-directional pedaling apparatuses, the bicycle can be used for a long time by dispersing the force concentrated by changing the power direction by using the plurality of planetary gears. Also, the rotation direction of the pedal shaft can be easily changed by using the changing lever, and the parts thereof can be miniaturized and accurately manufactured, thereby smoothly operating the bi-directional pedaling apparatus.

However, the above-described inventions have the following problems. That is, it is difficult to manufacture the parts through mass production and to assemble each part. Also, it is impossible to directly apply the bi-directional pedaling apparatus to the convention bicycle. In addition, the bicycle cannot be pulled back due to the reverse-load caused by the engagement of the ratchet.

DISCLOSURE OF THE INVENTION

To solve the above problems, it is an object of the present invention to provide an apparatus for changing power direction for a bicycle, in which a ratchet means of a shaft housing and a driving sprocket, and ratchet means between a carrier and a sun gear are changeable by a roll-pin means, thereby increasing an anti-abrasion property of parts which change according to the forward and rearward pedaling of a pedal, and preventing damage to the parts by a reverse-load caused when pulling back the bicycle.

The power direction changing apparatus according to the present invention basically includes constituents of a conventional power direction changing apparatus, that is, a pedal shaft, a driving sprocket rotatably formed on the pedal shaft, a driven sprocket for transmitting the driving force of the driving sprocket to a rear wheel, a chain connecting the driving sprocket and the driven sprocket, and a rear wheel. To achieve the above object, it is provided that an apparatus for changing power direction for a bicycle having a sun gear connected with a pedal shaft, a carrier to which a plurality of planetary gears are fixed, and a sprocket housing having a ring gear, and the apparatus comprising: a shaft housing having a first roll-pin holding portion in which a plurality of slots with a predetermined depth from the circumference are formed; a first changing ring having a first roll-pin race portion to which a plurality of roll-pins are attached to be exposed to the inner and outer directions, the first roll-pin race portion being connected to the first roll-pin holding portion of the shaft housing, capable of rolling against the first roll-pin holding portion, wherein the position of the first roll-pin race portion in the first roll-pin holding portion is changed by a changing lever controlled from the outside; a second changing ring having an inner circumference contacting the first roll-pin race portion of the first changing ring and an outer circumference along which a second roll-pin race portion to which a plurality of second roll-pins are exposed to the inner and outer directions is formed; a sun gear rotatably installed on the shaft housing, and integrally rotating together with the pedal shaft rotating by driving a pedal; a sprocket housing rotatably installed on the pedal shaft, having a ring gear and a race ring at its inner circumference, wherein the race ring contact the outer circumference of the second roll-pin race portion of the second changing ring; a carrier having one side along which a plurality of planetary gears to be engaged with the sun gear and the ring gear of the sprocket housing are formed and the other side along which a second roll-pin holding portion having a plurality of slots with a predetermined depth against the circumference are formed, wherein the carrier is rotatably installed, with a gap along the circumference, to the inner circumference of the second roll-pin race portion of the second changing ring.

Preferably, the slots of the first roll-pin holding portions of the shaft housing and the second roll-pins holding portion of the carrier are formed by connecting the circumference and slant portions thereof, and the first roll-pins of the first changing ring and the second roll-pins of the second changing ring are installed, capable of rolling, in the slots and the slant portions. Preferably, the first roll-pins of the first changing ring and the second roll-pins of the second changing ring are placed at the slant portions of the first roll-pin holding portion of the shaft housing and the second roll-pin holding portion of the carrier to integrally fix the second changing ring, the carrier and the race ring. Preferably, the first roll-pins of the first changing ring and the second roll-pins of the second changing ring are placed at the slots of the first roll-pin holding portion of the shaft housing and the second roll-pin holding portion of the carrier to release the connection of the second changing ring, the carrier and the race ring. Preferably, protrusions of the second changing ring and grooves of the carrier are coupled to be integrally rotatable with a gap along the circumference.

Therefore, the power direction changing apparatus of the present invention can travel bicycle forward by pedaling forward, and travel forward and idle the bicycle by pedaling rearward. In addition, even though the sprocket housing reversely rotates, that is, the bicycle which stops moving is pulled rearward, the first and second roll-pins of the first and second changing rings are positioned at the slots and the slant portions of the first and second roll-pin holding portions of the shaft housing and the carrier, respectively, so that the carrier is fixed. As a result, the ring gear of the sprocket housing rotates the planetary gears, and the planetary gears rotate the sun gear, thereby rotating (idling) the pedal shaft. Thus, the bicycle is pulled back without reverse-load.

BEST MODE FOR CARRYING OUT THE INVENTION

Figure 1:
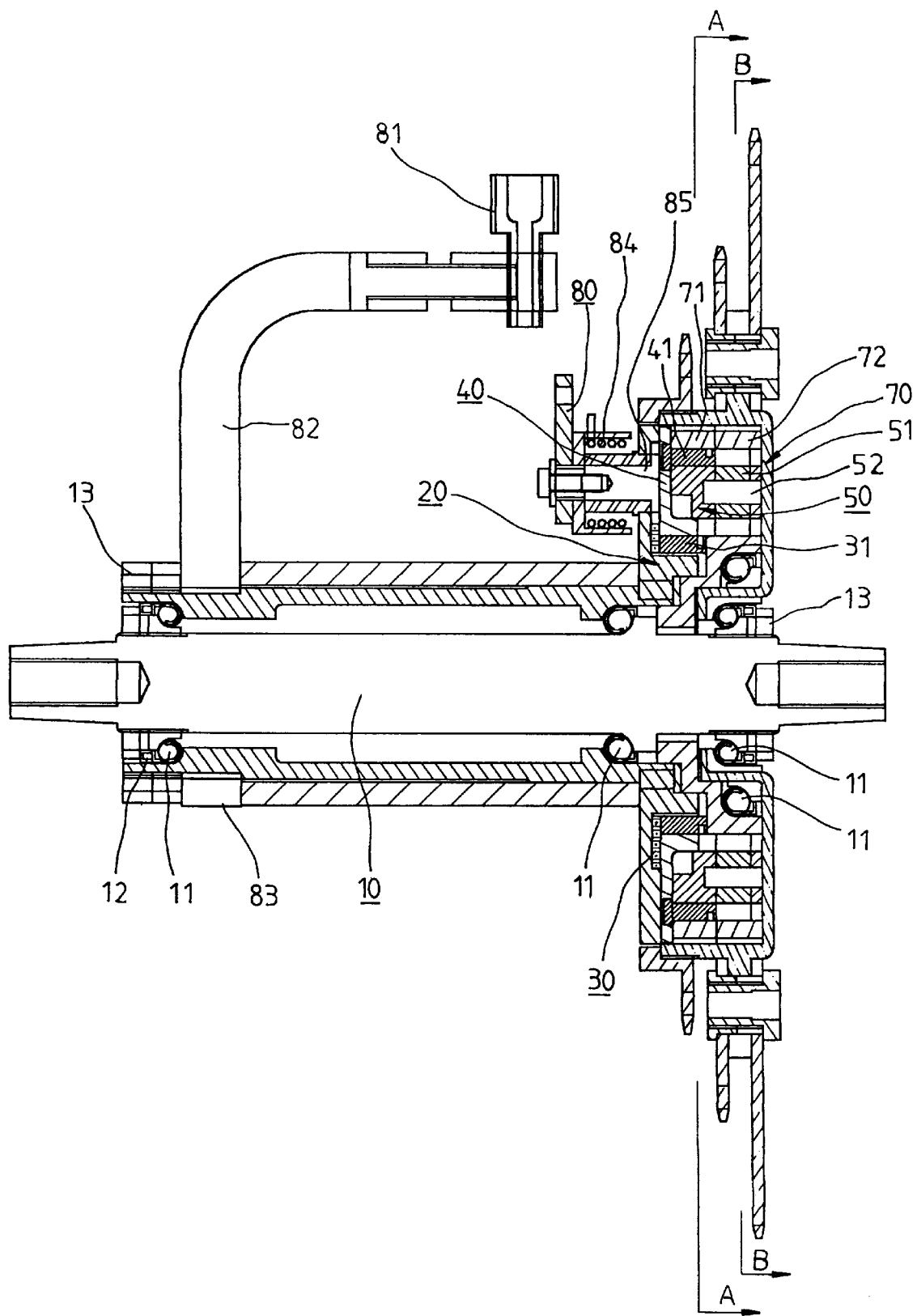
FIG. 1 is a section view of a power direction changing apparatus for a bicycle according to the present invention.
Figure 2A:
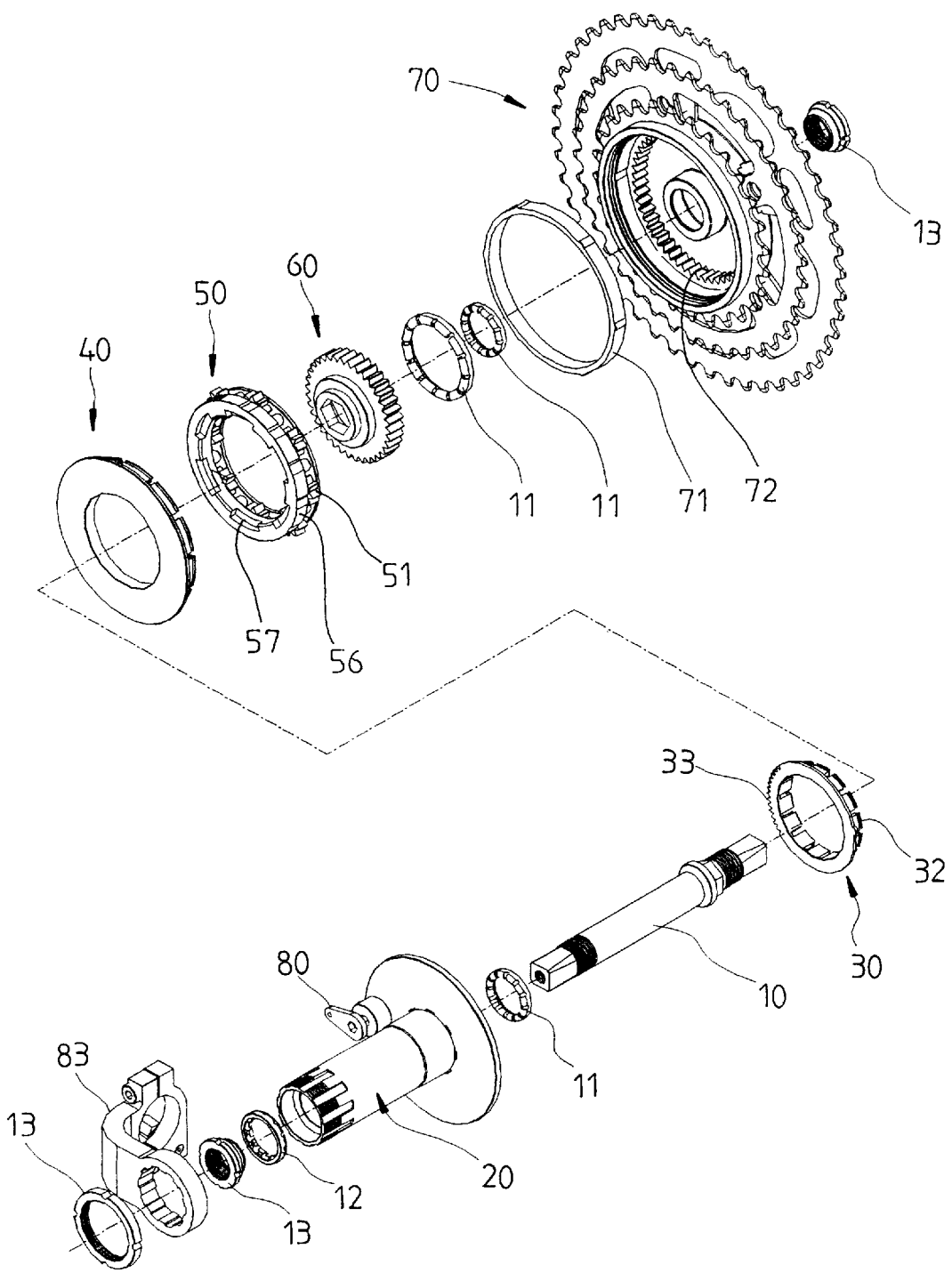
FIGS. 2A and 2B are exploded perspective views of the power direction changing apparatus of FIG. 1, viewed from the left and right, respectively.
Figure 2B:
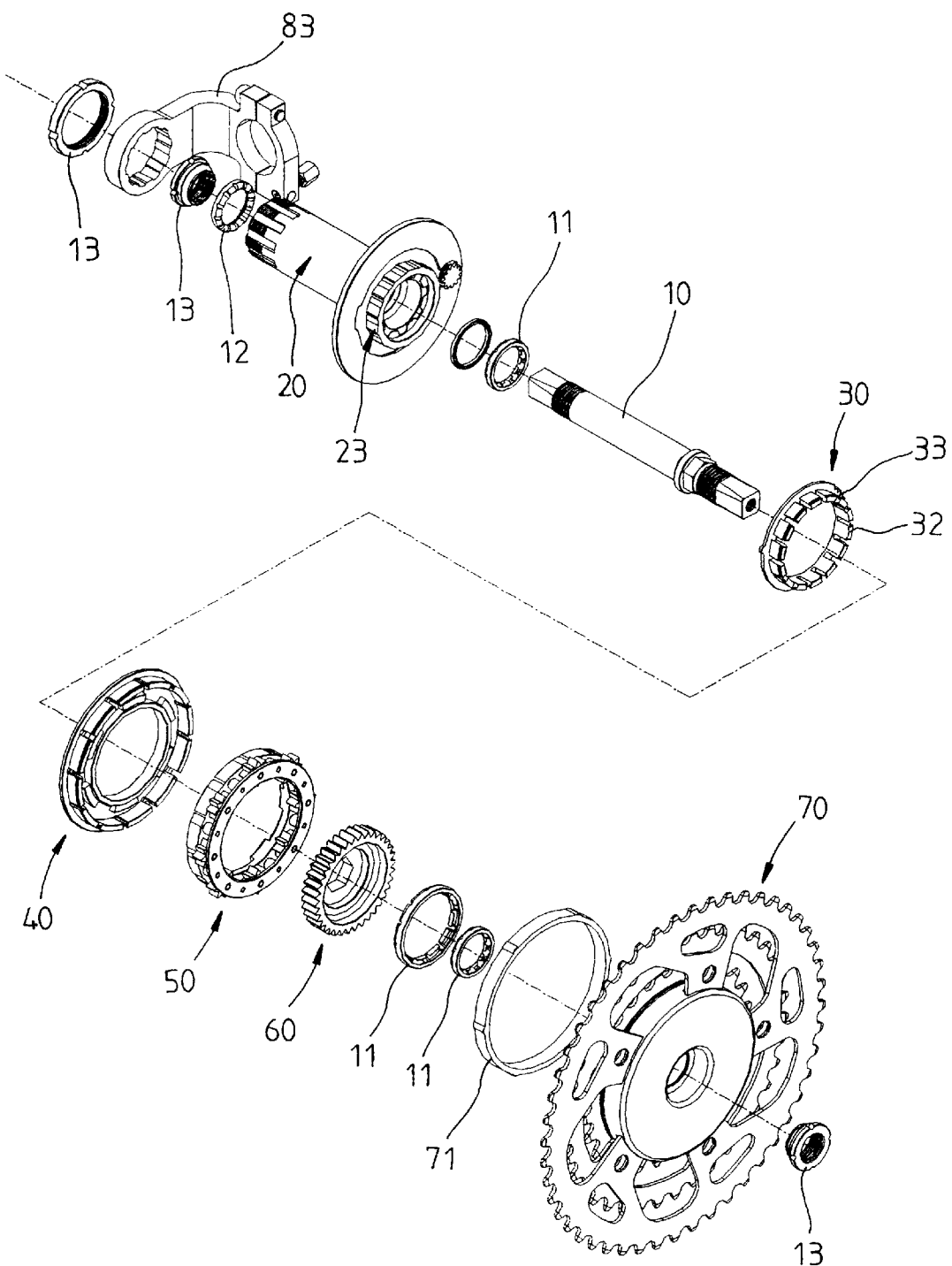

As shown in FIGS. 1, 2A and 2B, in a power direction changing apparatus of the present invention, a shaft housing 20, a first changing ring 30, a second changing ring 40, a carrier 50, a sun gear 60 and a sprocket housing 70 are coupled in sequence on a pedal shaft 10. The shaft housing 20 and the sprocket housing 70 are rotatably installed centering the pedal shaft 10 by bearings 11, and a retainer 12 and a nut 13, fixing means, are fixed to the outer ends of the shaft housing 20 and the sprocket housing 70.

Also, a changing lever 80 capable of changing the first changing ring 30 by the operation of an operating lever (not shown) attached to a handle of the bicycle is installed being connected to the operating lever by a wire (not shown). Here, a wire guide 81 for guiding the wire is fixed to the outer circumference of the shaft housing 20 by a bracket holder 83 via a wire guide bracket 82.

The shaft housing 20 with a cylindrical shape includes a first roll-pin holding portion 23 at its inner flange portion. The first roll-pin holding portion 23 has a plurality of slots 21 with a predetermined depth from the circumference.

As shown in FIGS. 3A through 3D, the slots 21 are formed along the first roll-pin holding portion 23 with a constant interval while the circumference and slant portions 22 are connected. Assuming that the circumstance of a circle centering the center point of the shaft housing 20 is a top dead center, each slot 21 forms a bottom dead center as a slot.

Also, the first changing ring 30 has a first roll-pin race portion 32 to which a plurality of roll-pins are placed to be exposed to the inner and outer directions, and a gear portion 33 along its circumference.

The first roll-pins 31 are rotatably installed in the first roll-pin race portion 32 with a constant interval such that the first changing ring 30 does a rolling against the first roll-pin holding portion 23 of the shaft housing 20 while being connected therewith. Also, the gear portion 33 is engaged with a gear 85 which can be elastically driven by the changing lever 80, controlled from the outside, and a restoring spring 84. Thus, the position of the first changing ring 30 at the first roll-pin holding portion 23, shown in FIGS. 3A and 3B, can be changed into the position shown in FIGS. 3C and 3D.

The second changing ring 40 has a circular plate shape having about 2-stage flange. The circumstance of the inner flange contacts the first roll-pin race portion 32 of the first changing ring 30 as shown in FIGS. 3A through 3D, and the circumference of the outer flange has a second roll-pin race portion 42 to which a plurality of second roll-pins 41 are installed to be exposed to the inner and outer directions.

The second roll-pins 41 are rotatably installed in the second roll-pin race portion 42 with a constant interval in the same manner as the first roll-pins 31 of the first changing ring 30.

As described above, since the sun gear 60 is integrally connected with the pedal shaft 10, the sun gear 60 transmits the power of the pedal shaft 10 to a carrier 50 while rotating in the same direction as the rotation direction of the pedal shaft 10.

The sprocket housing 70 having a cylindrical shape with a large diameter is rotatably installed on the pedal shaft 10, and a ring gear 72 and a race ring 71 are integrally and forcibly fixed to the inner circumference thereof.

The race ring 71 contacts the outer circumference of the second roll-pin race portion 42 of the second changing ring 40 as shown in FIGS. 1, 3A through 3D, and the ring gear 72 is connected to be engaged with planetary gears 51 of the carrier 50.

Figure 4:
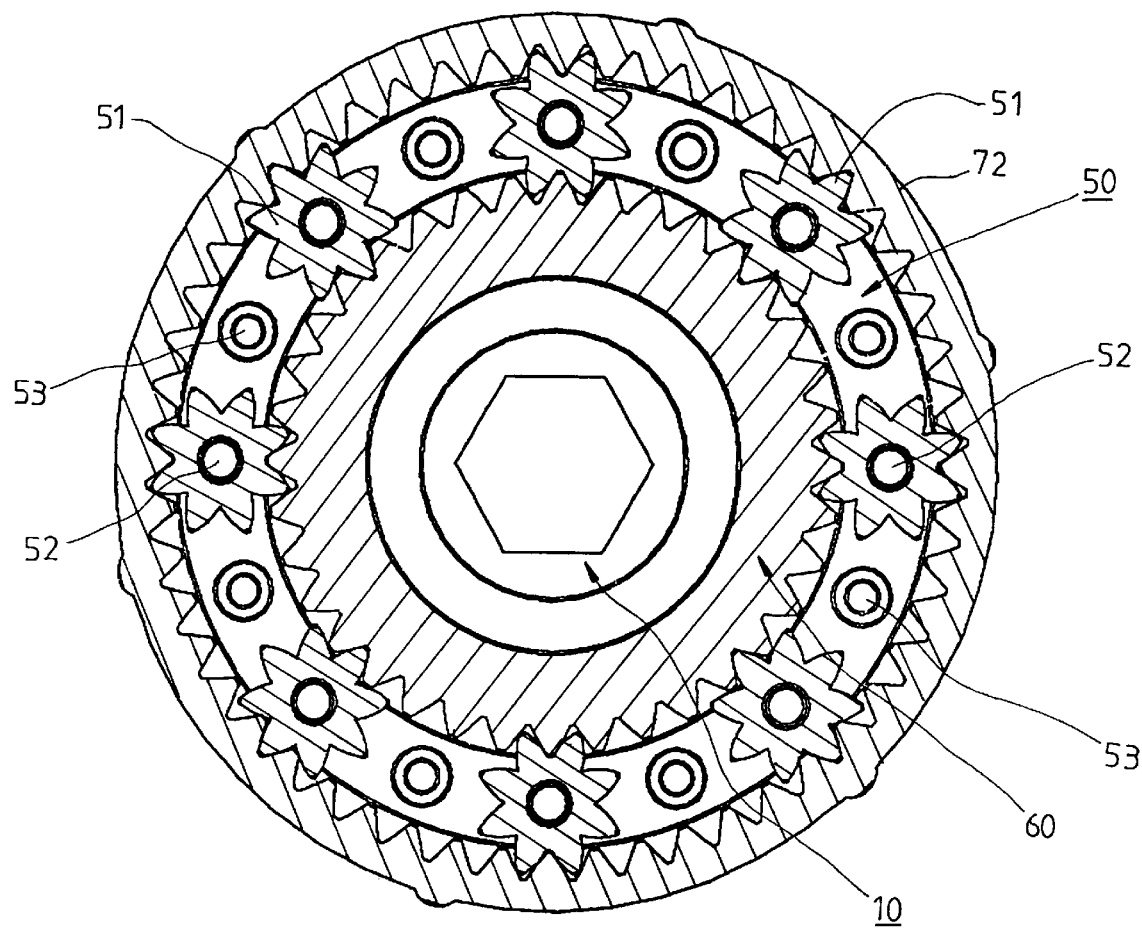
FIG. 4 is a section view cut along line B—B of FIG. 1.

The carrier 50 transmits the power from the pedal shaft 10 to the sprocket housing 70 by maintaining or changing the power direction. As shown in FIG. 4, the carrier 50 has a plurality of planetary gears 51 which are rotatably installed centering fixing shafts 52, and engaged with the sun gear 60 and the ring gear 72 of the sprocket housing 70. It is preferred that the number of the planetary gears 51 of the carrier 50, which diversifies the force converged by the direction change, is eight.

Also, as shown in FIGS. 2A and 4, the second roll-pin holding portion 56 having a plurality of a slots 54 with a predetermined depth against the circumference are integrally fixed to the carrier 50 by connection shafts 53.

In the same manner as in the above-described shaft housing 20, the slots 54 are formed with a constant interval along the second roll-pin holding portion 56 as shown in FIGS. 3A through 3D, while the circumference and slant portions 55 are connected. Assuming that the circumstance of a circle centering the center point of the carrier 50 is a top dead center, each slot 54 forms a bottom dead center as a slot.

Also, the second roll-pin holding portion 56 contacts the inner circumference of the second roll-pin race portion 42 of the second changing ring 40. At the same time, the second roll-pin holding portion 56 is rotatably installed in the second changing ring 40 with a predetermined gap along the circumference.

That is, protrusions 43 of the second changing ring 40 are rotatably coupled with grooves 57 of the second roll-pin holding portion 56 of the carrier 50 with a predetermined gap along the circumference as shown in FIGS. 3A through 3D.

The first roll-pins 31 of the first changing ring 30 and the second roll-pins 41 of the second changing ring 40 are placed at the slant portions 22 and 55 of the first and second roll-pin holding portions 23 and 56 of the shaft housing 20 and the carrier 50, such that the second changing ring 40, the carrier 50 and the race ring 71 are integrally fixed or separated from each other.

The operation and effect of the power direction changing apparatus according to the present invention will be described.

For convenience in explanation, "forward traveling by the forward pedaling" and "idling by the rearward pedaling", as in a conventional bicycle, while the first changing ring 30 is operated, and "forward traveling by the forward pedaling" and "forward traveling by the rearward pedaling" while the first changing ring 30 is not operated, will be described.

Figure 3A:
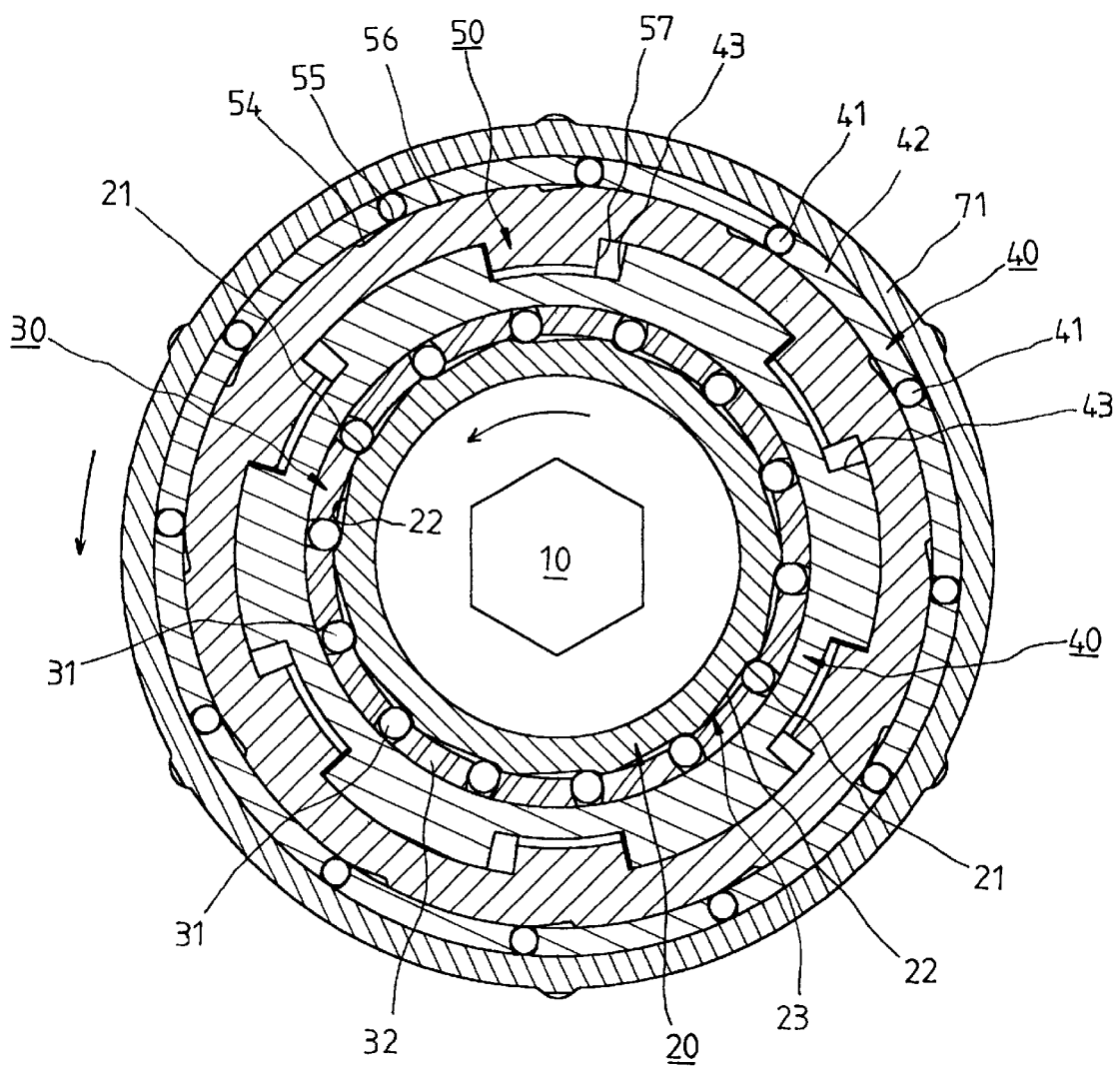
FIG. 3A is a section view cut along line A—A of FIG. 1, from which the driving sprocket and the sprocket housing are eliminated, for illustrating the forward pedaling while a changing lever is operated.
Figure 3B:
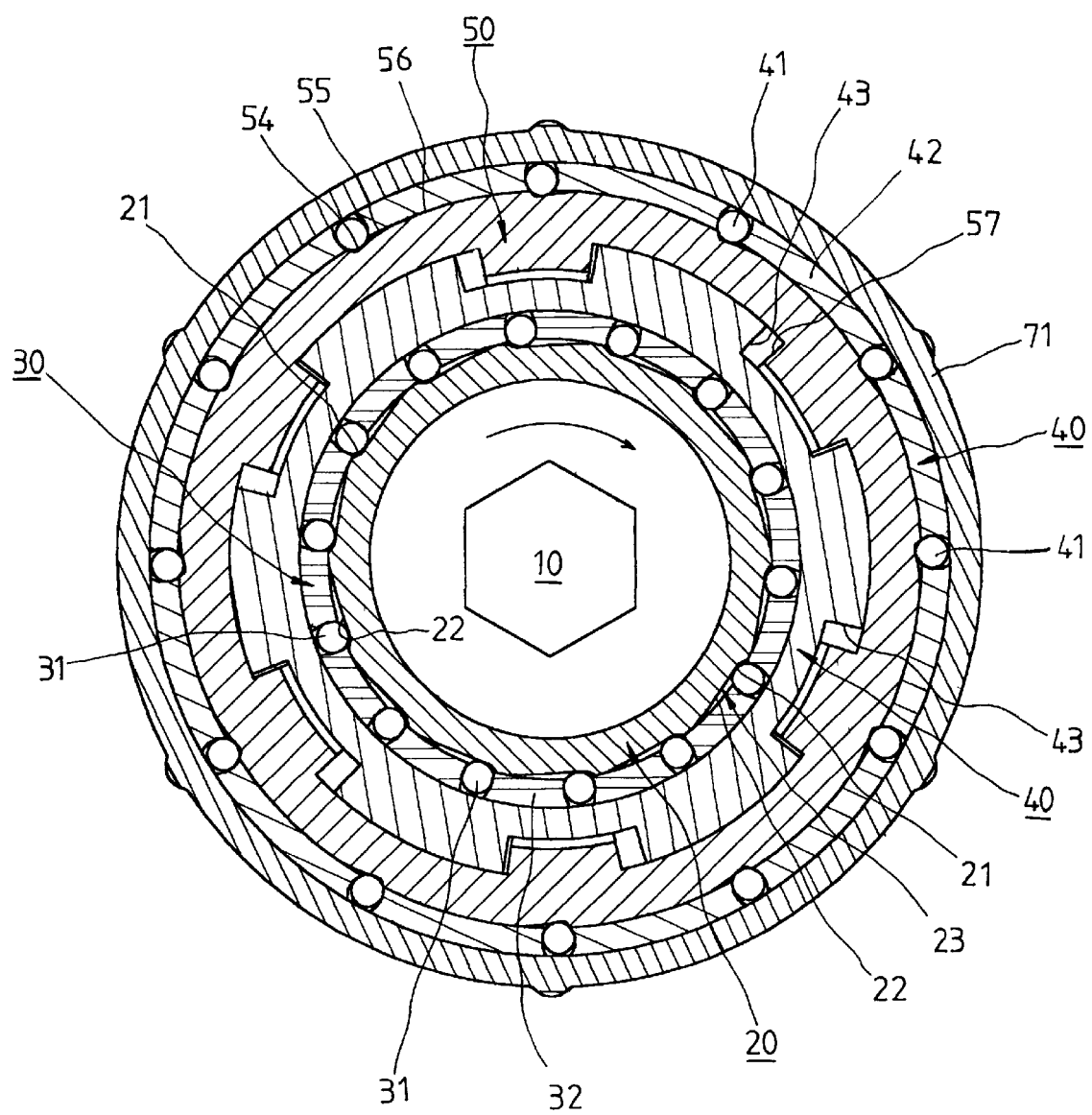
FIG. 3B is a section view cut along line A—A of FIG. 1, from which the driving sprocket and the sprocket housing are eliminated, for illustrating the rearward pedaling while the changing lever is operated.
Figure 3C:
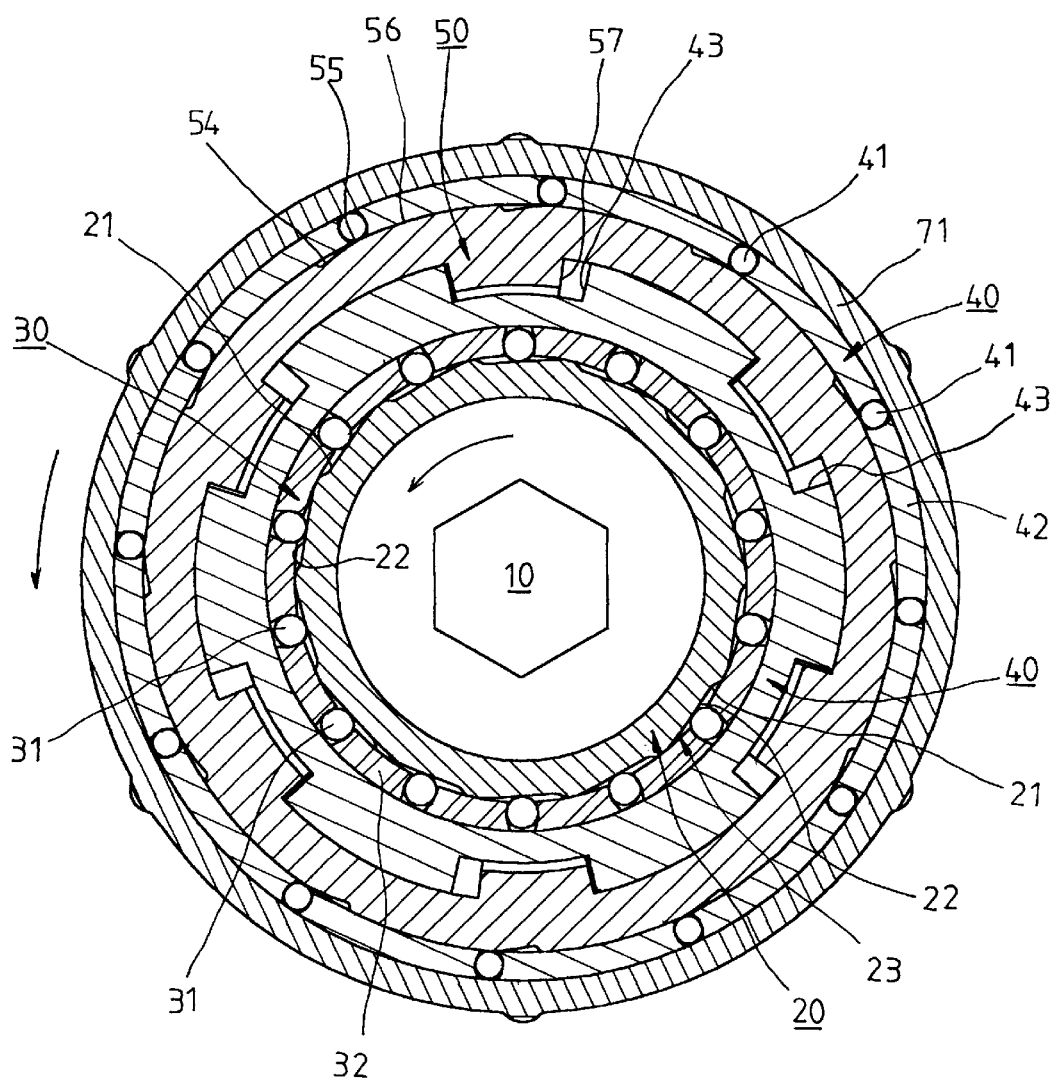
FIG. 3C is a section view cut along line A—A of FIG. 1, from which the driving sprocket and the sprocket housing are eliminated, for illustrating the forward pedaling while the changing lever is released.
Figure 3D:
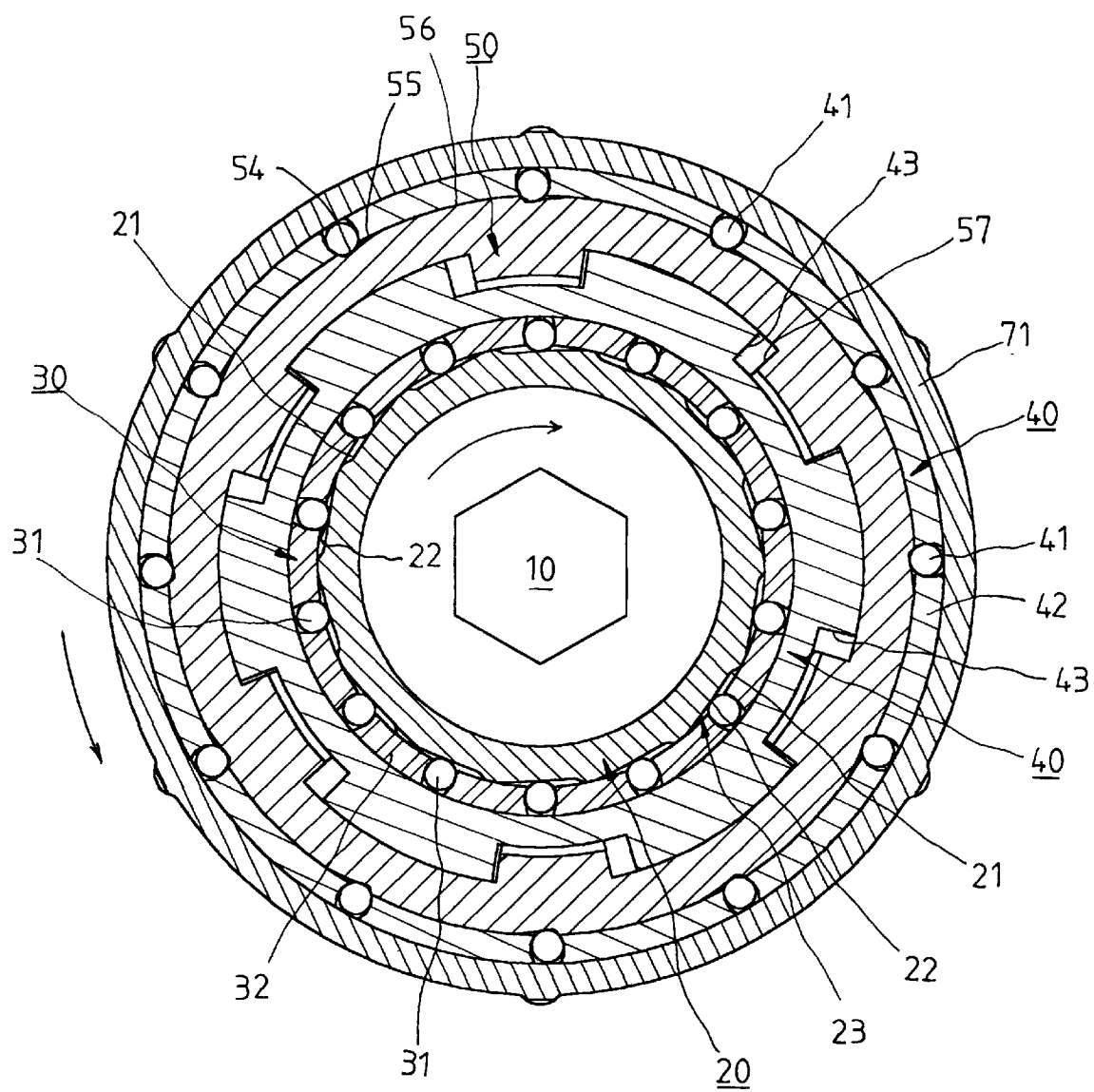
FIG. 3D is a section view cut along line A—A of FIG. 1, from which the driving sprocket and the sprocket housing are eliminated, for illustrating the rearward pedaling while a changing lever is released.

The operating condition of the first changing ring 30 refers to that the first roll-pins 31 of the first changing ring 30 are positioned at the slots 21 of the shaft housing 20, as shown in FIGS. 3A and 3B, by operating the changing lever 80. On the contrary, the released condition of the first changing ring 30 refers to that the first roll-pins 31 of the first changing ring 30 are positioned at the slant portions 22 of the shaft housing 20, as shown in FIGS. 3C and 3D, by restoring the changing lever 80 into the its original state.

The "forward traveling by the forward pedaling" under the operating condition of the first changing ring 30 refers to the state where the bicycle travels forward by driving the pedal shaft 10 counterclockwise of FIG. 3A. The power transmission mechanism in this state will be described.

When driving the pedal shaft 10, the sun gear 60 rotates in the same direction. Here, the sun gear 60 is engaged with the planetary gears 51 of the carrier 50, so that the driving force of the sun gear 60 and the planetary gear 51 rotates the carrier 50 counterclockwise as shown in FIG. 3A.

That is, the second roll-pins 41 of the second changing ring 40 are positioned at the slant portions 55 of the second roll-pin holding portion 56 of the carrier 50 by the rotary driving force of the sun gear 60, so that the carrier 50, the second changing ring 40 and the race ring 71 of the sprocket housing 70 integrally rotate in the same direction as the driving direction of the pedal shaft 10.

As a result, the planetary gears 51 do not rotate but rotates the ring gear 72 of the sprocket housing 70, which is engaged with the planetary gears, so that the pedal shaft 10 and the sprocket housing 70 rotates in the same direction, thereby traveling forward the bicycle.

The "idling by the rearward pedaling" under the operating condition of the first changing ring 30 refers to the state where the driving force is not transmitted to the sprocket housing 70 by driving the pedal shaft 10 clockwise. The power transmission mechanism in this state will be described.

Before pedaling rearward, the second roll-pins 41 of the second changing ring 40 must be placed at the slots 54 of the second roll-pin holding portion 56 of the carrier 50, such that the connection between the carrier 50 and the race ring 71 of the sprocket housing 70 via the second changing ring 40 must be released unlike the above.

When driving the pedal shaft 10 clockwise, the sun gear 60 rotates in the same direction. Here, the sun gear 60 is engaged with the planetary gears 51 of the carrier 50, so that the driving force of the sun gear 60 and the planetary gear 51 rotates the carrier 50 clockwise as shown in FIG. 3B.

That is, the second roll-pins 41 of the second changing ring 40 rotate in the direction as shown in FIG. 3B to be positioned at the slots 54 of the second roll-pin holding portion 56 of the carrier 50 by the rotary driving force of the sun gear 60, so that the contact among the carrier 50, the second changing ring 40 and the race ring 71 of the sprocket housing 70 are broken, releasing the carrier 50. Thus, the sun gear 60 cannot transmit the driving force to the carrier 50.

As a result, the planetary gears 51 rotate and simultaneously the carrier 50 itself revolves the pedal shaft 10 clockwise. Thus, the driving force of the pedal shaft 10 is transmitted to the carrier 50, not to the sprocket housing 70, so that the bicycle cannot travel.

The "forward traveling by the forward pedaling" while the first changing ring 30 is released refers to the state where the bicycle travels forward by driving the pedal shaft 10 counterclockwise as shown in FIG. 3C. The power transmission mechanism in this state will be described.

As the changing lever 80 is released, the first roll-pins 31 of the first changing ring 30 are positioned at the slant portions 22 of the shaft housing 20 as shown in FIG. 3C, so that the second changing ring 40 is fixed to the shaft housing 20. But, in this case, when one pedals counterclockwise, the sun gear 60 rotates the same direction, therefore, the second changing ring 40 is likely to rotate the same direction. But, because of the friction between the second changing ring 40 and the first changing ring 30, the first changing ring 30 rotates very small degrees and the first roll-pins 31 are loosen. Therefore, there is slipping between the second changing ring 40 and the shaft housing 20. Eventually, the second changing ring 40 is not fixed to the shaft housing 20.

When driving the pedal shaft 10, the sun gear 60 rotates in the same direction. Here, the sun gear 60 is engaged with the planetary gears 51 of the carrier 50, so that the driving force of the sun gear 60 and the planetary gear 51 rotates the carrier 50 counterclockwise as shown in FIG. 3C. Thus, the sprocket housing 70 rotates counterclockwise. That is, the operation mechanism of this state is the same as when the first changing ring 30 operates, thus the detailed explanation thereof will be omitted.

The "forward traveling by the rearward pedaling" while the first changing ring 30 is released refers to the state where the bicycle travels forward by driving the pedal shaft 10 clockwise as shown in FIG. 3D. The power transmission mechanism in this state will be described.

As the changing lever 80 is released, the first roll-pins 31 of the first changing ring 30 are positioned at the slant portions 22 of the shaft housing 20 as shown in FIG. 3D, so that the second changing ring 40 is fixed to the shaft housing 20. On the contrary to FIG. 3C, in this case, there is no slipping between the second changing ring 40 and the shaft housing 20, thereby, the carrier 50 is also fixed.

When driving the pedal shaft 10 clockwise, the sun gear 60 rotates in the same direction to transmit the driving power to the planetary gears 51 of the carrier 50, thereby rotating the planetary gear 51.

Here, such rotation of the planetary gear 51 provides a force to rotate the carrier 50 integrated therewith clockwise. However, the carrier 50 fixed to the first changing ring 30 cannot rotate clockwise.

Thus, only the planetary gears 51 rotate counterclockwise as shown in FIG. 4, thereby rotating the sprocket housing 70 engaged therewith counterclockwise.

The driving force provided to the pedal shaft 10 clockwise changes its direction via the power direction changing apparatus of the present invention according to the above mechanism, thereby resulting in the counterclockwise driving force at the sprocket housing 70. As a result, the bicycle travels forward.

Hereinafter, examples of the operation of the power direction changing apparatus according to the present invention, capable of preventing constituents from damage without a reverse-load when pulling back the bicycle, will be described.

First, the operation of the power direction changing apparatus will be described in the states of "forward traveling by the forward pedaling" and "idling by the rearward pedaling" while the changing lever is operated.

When pulling back the bicycle while the changing lever 80 is operated, a driving sprocket connected to a driven sprocket of a rear wheel by a chain is driven rearward, so that the sprocket housing 70 rotates clockwise by the driving sprocket (not shown) in the state of FIG. 3A (forward traveling by the forward pedaling). As a result, the ring gear 72 of the sprocket housing 70 drives the planetary gears 51 of the carrier 50 clockwise, thereby rotating the carrier 50 clockwise. Also, the race ring 71 slidably rotates due to the protrusions 43 of the second changing ring 40 and the grooves 57 of the carrier 50 while the second roll-pins 41 of the second changing ring 40 are located at the slots 54 of the carrier 50.

Here, the first roll-pins 31 of the first changing ring 30 are positioned at the slots 21 of the first roll-pin holding portion 23, so that the first changing ring 40 can rotate clockwise.

Also, in the state of FIG. 3B (idling by the rearward pedaling), the race ring 71 slidably rotates while the second roll-pins 41 are positioned at the slots 54 of the carrier 50.

Thus, the first roll-pins 31 of the first changing ring 30 are positioned at the slots 21 of the first roll-pin holding portion 23, so that the first changing ring 40 can rotate clockwise. Accordingly, the bicycle is pulled back without reverse-load.

Second, the operation of the power direction changing apparatus when pulling back the bicycle will be described in the states of "forward traveling by the forward pedaling" and "forward traveling by the rearward pedaling" while the changing lever is released.

When the changing lever 80 is released, the sprocket housing 70 rotates clockwise by the driving sprocket in the state of FIG. 3C (forward traveling by the forward pedaling), and the ring gear 72 of the sprocket housing 70 drives the planetary gears 51 of the carrier 50 clockwise.

Here, the race ring 71 slidably rotates due to the protrusions 43 of the second changing ring 40 and the grooves 57 of the carrier 50 while the second roll-pins 41 of the second changing ring 40 are located at the slots 54 of the carrier 50.

Also, in the state of FIG. 3D (forward traveling by the rearward pedaling), the race ring 71 slidably rotates while the second roll-pins 41 are positioned at the slots 54 of the carrier 50.

In the states of FIGS. 3C and 3D, because the first roll-pins 31 of the first changing ring 30 are positioned at the slant portions 22 of the first roll-pin holding portion 23 of the shaft housing 20, the second changing ring 40 is in position of being fixed to the shaft housing 20. But in the state of FIG. 3C, when one pedals counterclockwise, there is slipping between the second changing ring 40 and the shaft housing 20. On the contrary, in the state of FIG. 3D, when one pedals clockwise, there is no slipping between them, then, the second changing ring 40 is fixed to the shaft housing 20, and carrier 50 are also fixed to the shaft housing 20.

Thus, while the carrier 50 is fixed, the ring gear 72 of the sprocket housing 70 rotates the planetary gears 51 clockwise, and the planetary gears 51 rotate the sun gear 60 counterclockwise. As a result, the pedal shaft 10 rotates (idles), thereby pulling back the bicycle without reverse-load.

Industrial Applicability

As described above, the power direction changing apparatus of the present invention can travel bicycle forward by pedaling forward, and travel forward and idle the bicycle by pedaling rearward. In addition, even though the sprocket housing reversely rotates, that is, the bicycle which stops moving is pulled back, the first and second roll-pins of the first and second changing rings are positions at the slots and the slant portions of the first and second roll-pin holding portions of the shaft housing and the carrier, respectively, so that the carrier is fixed. As a result, the ring gear of the sprocket housing rotates the planetary gears, and the planetary gears rotate the sun gear, thereby rotating (idling) the pedal shaft. Thus, the bicycle is pulled back without reverse-load.

What is claimed is:

1. An apparatus for changing power direction for a bicycle, comprising:

a shaft housing having a first roll-pin holding portion in which a plurality of slots with a predetermined depth from a circumference thereof are formed;

a first changing ring having a first roll-pin race portion to which a plurality of first rolls-pins are attached so as to be exposed radially to inner and outer directions, the first roll-pin race portion being connected to the first roll-pin holding portion of the shaft housing by the first roll-pins, and the first changing ring capable of rolling against the first roll-pin holding portion, wherein a position of the first roll-pin race portion relative to the first roll-pin holding portion is changed by a changing lever controlled from outside the shaft housing;

a second changing ring having an inner circumference contacting the first roll-pin race portion of the first changing ring and an outer circumference along which a second roll-pin race portion, to which a plurality of second roll-pins are installed so as to be exposed radially to inner and outer directions, is formed;

a sun gear rotatably installed on the shaft housing, and integrally rotating together with a pedal shaft rotated by driving a pedal;

a sprocket housing rotatably installed on the pedal shaft, and having a ring gear and a race ring at an inner circumference thereof, wherein the race ring contacts an outer circumference of the second roll-pin race portion of the second changing ring;

a carrier having a first side along which a plurality of planetary gears, to be engaged with the sun gear and the ring gear of the sprocket housing, are mounted and a second side along which a second roll-pin holding portion having a plurality of slots with a predetermined depth from a circumference thereof is formed, wherein the carrier is rotatably installed, with a gap along a circumference thereof, within an inner circumference of the second roll-pin race portion of the second changing ring.

2. The apparatus of claim 1, wherein the slots of the first roll-pin holding portion of the shaft housing and the slots of the second roll-pin holding portion of the carrier are formed by connecting the circumference and slant portions of the first roll-pin holding portion and the circumference and slant portions of the second roll-pin holding portion, respectively, and wherein the first roll-pins of the first changing ring and the second roll-pins of the second changing ring are installed, and capable of rolling, in the slots and the slant portions of the first roll-pin holding portion and the second roll-pin holding portion, respectively.

3. The apparatus of claim 1, wherein the first roll-pins of the first changing ring and the second roll-pins of the second changing ring are placed at slant portions of the first roll-pin holding portion of the shaft housing and slant portions of the second roll-pin holding portion of the carrier, respectively, to integrally connect the second changing ring, the carrier and the race ring.

4. The apparatus of claim 3, wherein the first roll-pins of the first changing ring and the second roll-pins of the second changing ring are placed at the slots of the first roll-pin holding portion of the shaft housing and the slots of the second roll-pin holding portion of the carrier, respectively, to release the connection of the second changing ring, the carrier and the race ring.

5. The apparatus of claim 1, wherein protrusions of the second changing ring and grooves of the carrier are coupled such that the second changing ring and the carrier are integrally rotatable with the gap along the circumference of the carrier.

\* \* \* \* \*